(12) United States Patent
Gong

(10) Patent No.: US 8,930,735 B2
(45) Date of Patent: Jan. 6, 2015

(54) METHOD AND DEVICE FOR MANAGING HANDHELD DEVICE POWER CONSUMPTION

(75) Inventor: Yougang Gong, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 350 days.

(21) Appl. No.: 13/258,432

(22) PCT Filed: May 21, 2010

(86) PCT No.: PCT/CN2010/073080
§ 371 (c)(1), (2), (4) Date: Nov. 21, 2011

(87) PCT Pub. No.: WO2010/133186
PCT Pub. Date: Nov. 25, 2010

(65) Prior Publication Data
US 2012/0086493 A1    Apr. 12, 2012

(30) Foreign Application Priority Data
May 22, 2009    (CN) .......................... 2009 1 0107519

(51) Int. Cl.
G06F 1/32    (2006.01)
H04W 52/02    (2009.01)

(52) U.S. Cl.
CPC ............ *H04W 52/0287* (2013.01); *Y02B 60/50* (2013.01)
USPC ...................................................... 713/320

(58) Field of Classification Search
USPC ....................................................... 713/320
See application file for complete search history.

(56) References Cited

U.S. PATENT DOCUMENTS

| 5,812,860 | A  | * | 9/1998  | Horden et al. | 713/322 |
| 6,076,171 | A  | * | 6/2000  | Kawata | 713/501 |
| 8,103,857 | B2 | * | 1/2012  | Shin | 712/220 |
| 2004/0117680 | A1 | * | 6/2004  | Naffziger | 713/322 |
| 2006/0226243 | A1 | * | 10/2006 | Dariel | 235/492 |
| 2007/0006006 | A1 | * | 1/2007  | Henson | 713/322 |
| 2008/0059828 | A1 | * | 3/2008  | Siggelkow et al. | 713/501 |
| 2010/0262969 | A1 | * | 10/2010 | Dijkstra et al. | 718/104 |

FOREIGN PATENT DOCUMENTS

| CN | 1902963 | A | 1/2007 |
| CN | 1940857 | A | 4/2007 |
| CN | 101273369 | A | 9/2008 |
| CN | 101365192 | A | 2/2009 |
| EP | 1700502 | B1 | 9/2007 |
| GB | 2443307 | A | 4/2008 |

OTHER PUBLICATIONS

International Search Report in international application No. PCT/CN2010/073080, mailed on Sep. 2, 2010.
English Translation of the Written Opinion of the International Search Authority in international application No. PCT/CN2010/073080, mailed on Sep. 2, 2010.

\* cited by examiner

*Primary Examiner* — Nimesh G Patel
(74) *Attorney, Agent, or Firm* — Oppedahl Patent Law Firm LLC

(57) ABSTRACT

A method and device for managing handheld device power consumption are disclosed. The method includes the following steps of: calculating an operating frequency needed by the function currently operated by the handheld device; and setting the system clock of the handheld device according to the operating frequency.

15 Claims, 3 Drawing Sheets

Setting the frequency of the function currently operated by the handheld device chip as an operating frequency — S1

Obtaining the needed operating frequency through setting the system clock of the handheld device — S2

METHOD AND DEVICE FOR MANAGING HANDHELD DEVICE POWER CONSUMPTION

TECHNICAL FIELD

The present invention relates to the field of communications, particularly to a method and device for managing handheld device power consumption.

BACKGROUND

Currently, the handheld device market is fiercely competitive. In addition to price, the handheld device manufacturers also give more reliance on the perfect functions and good performance of the products. To a large extent, the performance of a handheld device is represented by its power consumption.

Usually, the research on managing the power consumption of handheld devices is concentrated on the design for hardware power consumption, for example: a design for power supply, a design for different voltage and a design for sleep and deep sleep modes. These designs for hardware power consumption have obvious effect, taking the design for power supply partitions for example, the current is measured through opening or closing every partition after projecting the chip, so as to calculate the power consumption of each partition. During the application, the power supply of an unused partition is switched off and the power supply of a used partition is switched on, thereby the goal of saving power consumption is realized. For another example: in the design for sleep and deep sleep modes, when the handheld device does not need to use the core, but needs to use the peripherals, it will enter a sleep mode; when the handheld device does not need to use both the core and the peripherals, it will enter a deep sleep mode. This design can also achieve the goal of saving power consumption.

Nevertheless, the foregoing power consumption management focuses on the switching between a working state and a pause state of the handheld device and does not separately consider the power consumption of the handheld device is different when the chip of the handheld device is on different operating frequencies at the working state.

The formula for calculating the power consumption of the chip of the handheld device is: Pt=Fre×Pw; where Pt (unit: mw) is the total power of the chip; Fre (unit: MHz) is an operating frequency of the chip; Pw (unit: mw/MHz) is the power consumption indicator of the chip.

Before projecting a chip, a low Pw value is determined typically through a hardware power consumption management policy, simplified design for digital logic and process selection. After projecting the chip, the management of power consumption is achieved mainly through controlling Fre when using the chip, i.e.: a Fre is set to make the power consumption of the handheld device low when the handheld device is in a normal working state and is operating on this Fre.

However, regarding each existing handheld device, its frequency when all functions of the handheld device are operated is set as a normal operating frequency. Even if the handheld device only uses a simple function, such as checking the time, playing an old school snake game or reading a short message, it will still run at the set operating frequency. Moreover, in the time after the operated function is achieved, the system will still run in an idle state of the operating frequency. Consequently, the fewer the functions of the handheld device are used and the longer the time of idle state is, the more the energy waste will be caused.

SUMMARY

In order to solve the problem that the power consumption of a handheld device is high when it runs fewer functions due to high operating frequency of the chip, the embodiment of present invention provides a method and device for managing handheld device power consumption.

For this reason, the embodiment of present invention discloses a method for managing handheld device power consumption, which comprises the following steps: calculating an operating frequency needed by a function currently operated by a handheld device; and setting a system clock of the handheld device according to the operating frequency.

In the foregoing method, the step of calculating the operating frequency needed by the function currently operated by the handheld device may further comprise: calculating the needed operating frequency according to the number of cycles of the clocks used by the tasks or functions called by the function currently operated by the processor of the handheld device.

In the foregoing method, calculating the needed operating frequency may further comprise: dividing a time period of the currently operated function into the total number of cycles of the clocks used by the tasks or functions called by the currently operated function, to obtain the operating frequency of the currently operated function.

In the foregoing method, the number of cycles may be the number of static cycles obtained through statistics in a simulation environment or the number of dynamic cycles obtained through operating the tasks or functions time and again. The step of setting the system clock of the handheld device may comprise: setting the output frequency of the system clock to be greater than or equal to the operating frequency.

In the foregoing method, the step of setting the system clock of the handheld device according to the operating frequency may further comprise:

step 1: Selecting a NO value according to $$\frac{NF}{NR} = \frac{Fout \times No}{Fin},$$

where NR is an input frequency division parameter, NF is a feedback parameter, NO is an output frequency division parameter, Fin is an input frequency, and Fout is an output frequency of the system clock;

step 2: Estimating the value of NF/NR; and step 3: Determining whether the output frequency obtained through a calculation is equal to the operating frequency; if the output frequency is equal to the operating frequency, configuring the handheld device with the NO, NF and NR values to which the output frequency corresponds; if the output frequency is not equal to the operating frequency, executing step 1 till there is not an unselected NO value; finding an output frequency closest to the operating frequency and configuring the handheld device with the NO, NF and NR values to which the closest output frequency corresponds when there is not an unselected NO value.

In the foregoing method, step 2 may further comprise: cutting a same number of bits from the bits of Fout×NO and Fin, and then rounding Fout×NO and Fin which have been cut to ensure the number of bits of the processed Fout×NO and that of the processed Fin accord with the number of the bits for expressing the frequency of the handheld device.

In the foregoing method, step 2 may further comprise: calculating the greatest common divisor of Fout×NO and Fin, and dividing the greatest common divisor into Fout×NO and Fin; if the numbers of the bits of the two quotients obtained after dividing the greatest common divisor into Fout×NO and Fin do not accord with the number of the bits for expressing the frequency of the handheld device, then cutting a same number of bits from the bits of the two quotients and rounding the quotients which have been cut to make them accord with the number of the bits for expressing the frequency of the handheld device; wherein the ratio of the two quotient is defined as a first fraction.

In the foregoing method, after the step of cutting a same number of bits from the bits of the two quotients and rounding the quotients which have been cut to make them accord with the number of the bits for expressing the frequency of the handheld device, to the method may further comprise:

step a: Determining whether the first fraction is smaller than the ratio of Fout×NO to Fin, and executing step b if the first fraction is smaller or executing step c if the first fraction is not smaller;

step b: Adding 1 to the numerator of the first fraction and taking 1 from the denominator, or adding 1 to both the numerator and denominator to obtain three fractions which are greater than the first fraction, choosing the fraction closest to the ratio of Fout×NO to Fin from those three fractions, and defining this chosen fraction as a second fraction, replacing the first fraction with the second fraction; determining whether step c has been executed, and executing step d if step c has been executed or executing step a if step c has not been executed;

step c: Taking 1 from the numerator of the first fraction, or adding 1 to the denominator, or taking 1 from both the numerator and denominator to obtain three fractions which are smaller than the first fraction; choosing the fraction closest to the ratio of Fout×NO to Fin from those three fractions, and defining this chosen fraction as a third fraction, replacing the first fraction with the third fraction; determining whether step b has been executed, and executing step d if step b has been executed or executing step a if step b has not been executed; and;

step d: Choosing the fraction closest to the ratio of Fout× NO to Fin from the second fraction and the third fraction, defining this chosen fraction as a fourth fraction, calculating the greatest common divisor of the numerator and denominator of the fourth fraction, and dividing the greatest common divisor into the numerator and denominator of the fourth fraction to obtain NF/NR ratio.

Accordingly, the embodiment of present invention also provides a device for managing handheld device power consumption, which comprises: a frequency calculating unit configured to calculate an operating frequency needed by the function currently operated by the handheld device; a clock setting unit configured to set a system clock of the handheld device according to the operating frequency.

The frequency calculating unit further comprises: a statistics module configured to perform statistics on the number of cycles of the clocks used by the tasks or functions called by the currently operated function, formulate a relation table between tasks or functions and number of cycles, and revise the formulated relation table by using the obtained number of cycles of the tasks or functions; a calculation module configured to calculate the needed operating frequency according to the number of cycles of the clocks used by the tasks or functions called by the currently operated function.

In the foregoing device, the clock setting unit may be further configured to set an output frequency of the system clock to be greater than or equal to the operating frequency.

Compared with the relating technologies, the method for managing handheld device power consumption provided by the embodiment of present invention can dynamically set the operating frequency, reasonably adjusts the operating frequency when the handheld device executes more functions or fewer functions, thus less power is consumed when the handheld device executes fewer functions.

After the detailed descriptions of the embodiments of the present invention are read by referring to the accompanying drawings, the features and advantages of the embodiment of present invention will become more evident.

DETAILED DESCRIPTION OF THE EMBODIMENTS

A method for managing handheld device power consumption provided by the embodiment of present invention will now be described by referring to the accompanying drawings.

Figure 1:
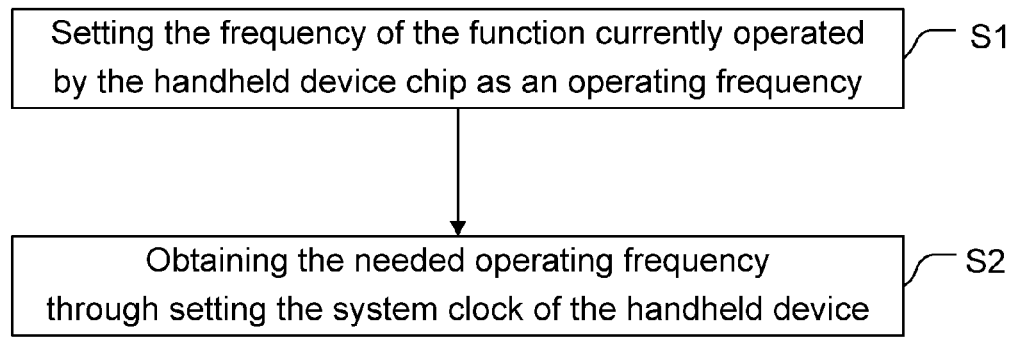
FIG. 1 is a schematic diagram illustrating a process of an example of a method for managing handheld device power consumption provided by the embodiment of present invention.

Please refer to FIG. 1, which shows a process of an example of the method for managing handheld device power consumption provided by the embodiment of present invention. The example of the method includes the following steps:

step S1: Calculating an operating frequency needed by a function currently operated by a handheld device;

The frequency needed by the function currently operated by the handheld device is calculated and set as an operating frequency. In step S1, firstly statistics should be made on the number of cycles of the tasks called by the function. The number of cycles is the number of static cycles obtained through statistics in a simulation environment or the number of dynamic cycles obtained through operating tasks or functions by the user terminal on many occasions. Then a relation table between tasks and number of cycles is formulated. The operating frequency needed by the function currently operated by the processor of the handheld device is calculated according to the relation table. The determination of the relation table has two realization solutions, i.e.: a static solution and a dynamic solution, as described below:

1. Static Solution:

In an embedded development environment of a handheld device, there is a simulation environment, which is used to perform statistics on the number of cycles of the tasks or functions. Under the same initial condition, the number of cycles for the operation of each task or function is definite; and the number of cycles may vary with initial condition. A few different initial conditions are set. Statistics on the number of cycles of each task is made under different initial conditions. Then the number of cycles of the task or function is determined according to a preset principle, for example: the maximum number of cycles of each task or function is deemed as the number of cycles of the task or function; or the average number of cycles of each task or function is deemed as the number of cycles of the task or function. Then, a relation table between a task and the number of cycles is formulated to make the determined number of cycles correspond to the task, which as shown below:

| Relation table | | | | | | |
|---|---|---|---|---|---|---|
| Task No. | T1 | T2 | ... | Tn-2 | Tn-1 | Tn |
| Number of cycles | x1 | X5 | ... | Xn-2 | Xn-1 | Xn |

2. Dynamic Solution:

When a task or function is operated, a dynamic statistics module configured to the handheld device in advance is started to calculate the operation time of the task or function, the idle time of the system and the number of cycles used by the task or function. Moreover, after a period of time, through operating the task or function time and again, statistics is made on the number of cycles of the task or function during each operation. The number of cycles of the task or function is determined according to the preset principle, for example: the maximum number of cycles of each task or function is deemed as the number of cycles of the task or function; or the average number of cycles of each task or function is deemed as the number of cycles of the task or function. Further, the determined number of cycles of the task or function is used to revise the relation table formulated by the static solution, so that the relation table revised by the dynamic solution can be used during normal operation of the task or function.

It should be noted that a handheld device provides many functions, but seldom all functions are used at the same time during the use of the handheld device and generally, only one function or a combination of a few functions is used; wherein each function is achieved by a combination of some tasks in the system.

For example, to achieve Function F, tasks of T1, T2, ..., and Tm need to be called, then:

$$F_{cycle} = \sum_{n=1}^{m} Xn$$

Where, $F_{cycle}$ is the total number of cycles of the tasks called for operating Function F. Further, the frequency of the currently operated function is calculated according to the time period T needed for completing Function F and set as an operating frequency. Calculating the needed operating frequency includes: dividing the time period of the function into the total number of cycles of the tasks called for operating the current function. The obtained value is the operating frequency of the function and is expressed with a formula as below:

$$Freq = F_{cycle}/T$$

Wherein the time period T corresponds to Function F, for example: the wireless frame period T of a mobile phone corresponds to the function of signal reception and transmission of the mobile phone, the video frame period T corresponds to the function of video play and, the voice period T of a call corresponds to the function of communication of the mobile phone.

Further, when more than one function is completed by the handheld device, the frequencies of the operated functions should be added up, to obtain the operating frequency needed for the operation of the system.

step S2: Obtaining the needed operating frequency through setting the system clock of the handheld device.

Here, the output frequency of the system clock is set to be greater than or equal to the operating frequency according to the operating frequency, i.e., the output frequency of the system clock needs to be greater than or equal to the needed operating frequency. In step S2, a PLL (Phase Locked Loop) is used to design a clock system, e.g. locking and setting the frequency. One or a plurality of PLLs, a frequency divider and a clock selector together constitute a clock system. Wherein the PLL is the source of the clock and the configuration of the PLL is the key to the clock configuration and selection of the system.

Figure 2:
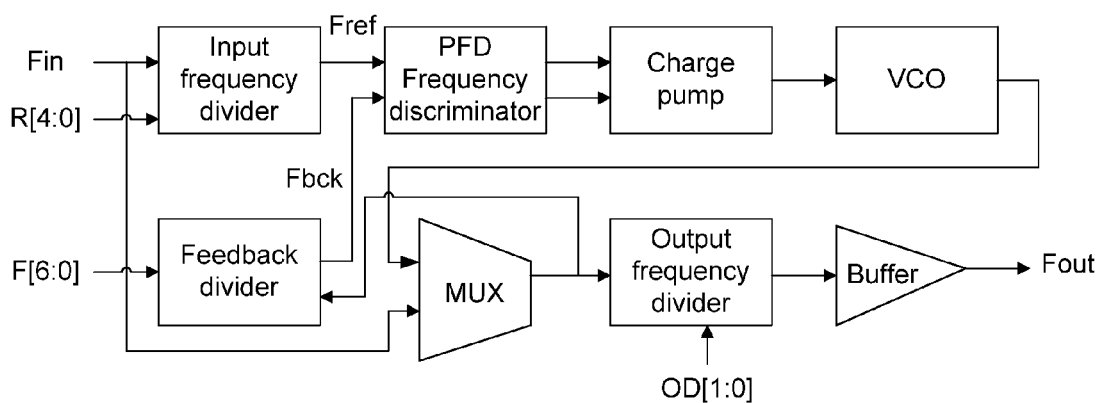
FIG. 2 is a schematic diagram illustrating a PLL circuit used by an example of a method for managing handheld device power consumption provided by the embodiment of present invention.

Further, a PLL circuit used by an example of the method for managing handheld device power consumption provided by the embodiment of present invention is as shown in FIG. 2, wherein an input frequency divider, a feedback divider and an output frequency divider are all dividers, which is configured to determine a frequency division relation of the input frequencies according to a frequency division coefficient and output the value after frequency reduction; a PFD frequency discriminator is a frequency comparator and outputs positive or negative voltage based on the frequency difference between Freg and Fbck. A charge pump is a driver, amplifies input voltage and then sends the amplified input voltage to Voltage-Controlled Oscillator (VCO). The VCO outputs a signal source with a specific frequency. The frequency of the signal source is decided by input voltage. The higher the input voltage is, the higher the output frequency will be. Here, a multiplexer (MUX) is an either-or circuit. A buffer is configured to shape waveform to make the waveform of the output frequency tidier and smoother.

The PLL circuit shown in FIG. 2 is just an example. Certainly, the calculation of the needed operating frequency Fout does not rely on the circuit composition. If the PLL circuit is changed, the calculation formula will not be changed, only the bit width (i.e. NF NR) of each circuit may be different.

In the PLL, Fref=Fin/NR, Fvco=Fref×NF, Fout=Fvco/NO, thus, it is obtained through regulating that:

$$Fout = Fin \times \frac{NF}{NR \times NO}$$

Where NR=R[4:0]+1, NF=F[5:0]+1, NO=$2^{OD[1:0]}$, OD[1:0] is a frequency division coefficient of an output clock, R[4:0] is an input frequency division coefficient of a reference clock, F[5:0] is a frequency division coefficient of a feedback clock, and Fin is a constant value.

To ensure Fout=Freq, the following parameters need to be determined: an input frequency division parameter NR, a feedback parameter NF and an output frequency division parameter NO. This embodiment provides two solutions to determine the parameters:

Solution 1:

A lookup table is set in advance. In the lookup table, all parameters of the system clock and the operating frequencies of the system they correspond to, i.e., the correspondence between NR/NF/No and Fout, are configured. In the lookup table, the parameters NR, NF and NO to which Fout=Freq corresponds are looked up, or the parameters NR, NF and NO to which the Fout closest to Freq corresponds are looked up. The handheld device is configured with the found parameters NR, NF and NO. In this case, when the system of the handheld device works, its operating frequency is Freq or close to Freq.

Solution 2:

As NO=$2^{OD[1:0]}$, it is known that NO has four values.

Parameters NR, NF and NO are determined by the following steps:

step 1: Selecting a NO value;

step 2: Approximately calculating NF/NR ratio;

step 3: Obtaining Fout(NO) through calculation based on $$Fout = Fin \times \frac{NF}{NR \times NO},$$

where Fout(NO) is the value of Fout when an NO value is selected at step 1, determining whether Fout(NO) is equal to Freq; if Fout(NO) is equal to Freq, ending the calculation and configuring the handheld device with the parameters NO, NF and NR to which Fout(NO) corresponds; if Fout(NO) is not equal to Freq, executing step 4;

step 4: Determining whether there is an unselected NO value, if there is an unselected NO value, executing step 1; if there is not an unselected NO value, executing step 5;

step 5: Finding a value closest to Freq from among all the Fout(NO) obtained through calculation, and configuring the handheld device with the parameters NO, NF and NR to which the value closest to Freq corresponds.

In step 2, according to formula $$Fout = Fin \times \frac{NF}{NR \times NO},$$

it is obtained after regulating that:

$$\frac{NF}{NR} = \frac{Fout \times No}{Fin}.$$

Here, NF=Fout×NO, NR=Fin, Fout=Freq may be set. Fout and Fin are in tens of mega orders of magnitude. To fully express them, 30 bits for expressing the frequency are needed. But in the foregoing PLL, NF has 7 bits, with an expression range of $0\sim2^8-1$; NR has 5 bits, with an expression range of $0\sim2^6-1$. They can not meet the requirement on frequency expression. step 2 further includes: cutting a same number of bits from the bits of Fout×NO and Fin, and then rounding Fout×NO and Fin which have been cut to make the number of bits of the processed Fout×NO and that of the processed Fin accord with the number of the bits for expressing the frequency of the handheld device.

Therefore, the embodiment provides the following three approximation methods to solve this problem:

Approximation method 1:

Direct truncation to the expressible bits is adopted. In other words, the numerator and denominator of NF/NR are both divided by $2^n$ and then rounded to obtain NF' and NR' within the limited range. Wherein the value of n is set to ensure NF' and NR' are within the limited range.

Example of truncation:

A decimal number "27" is expressed with 5 bits in binary system, i.e. 11011;

if it is truncated to express with 4 digits, i.e. 1101, when it is converted back to decimal system, it will become 13. As the number of truncated bits is 1, the original numeral will be deemed as 13×2+26. The truncation error is 1;

if it is truncated to express with 3 bits, i.e. 110, when it is converted back to decimal system, it will become 6. As the number of truncated bits is 2, the original numeral will be deemed as 6×4=24. The truncation error is 3;

if it is truncated to express with 2 bits, i.e. 11, when it is converted back to decimal system, it will become 3. As the number of truncated bits is 3, the original numeral will be deemed as 3×8=24. The truncation error is 3.

Obviously, the truncation may either generate or not generate an error. The essence is that the numeral to be processed is divided by $2^n$ to get a processed result and then the processed result is rounded.

Approximation method 2:

Simplifying $$\frac{Fout \times No}{Fin} \text{ of } \frac{NF}{NR} = \frac{Fout \times No}{Fin}$$

is proceeded. The greatest common divisor of the numerator Fout×No and the denominator Fin is calculated through Euclidean algorithm. The fraction is simplified by dividing the greatest common divisor into both the numerator and the denominator to get a simplification result. Determining whether the simplification result is within the limited range is proceeded; if yes, then it means NF and NR are obtained; if not, the truncation will be conducted as described in the foregoing approximation method 1.

For example: if the permitted value range is within 3 bits;

Supposing $$\frac{Fout \times No}{Fin}$$

is 320/240 and the greatest common divisor of which is 80, then the numerator and denominator are both divided by the greatest common divisor 80, and the fraction is simplified into 4/3. It is within the range that can be expressed by 3 bits, so NF=4 and NR=3. The processing is finished.

Supposing $$\frac{Fout \times No}{Fin}$$

is 320/230 and the greatest common divisor of which is 10, then the numerator and denominator are both divided by the greatest common divisor 10, and the fraction is simplified into 32/23. As it is not within the range that can be expressed by 3 bits, the truncation processing is conducted as described in the foregoing approximation method 1. In the end, NF=2 and NR=1 are obtained.

Approximation method 3:

In both the first method and the second method, the errors are all originated from a quantizing error. Normally, the quantizing error can not be eliminated. In light of the features of fractions, although quantizing error can not be eliminated, it may be reduced.

For example, a numeral is smaller than 7/8, but greater than 6/8; when the bit width of the numerator and denominator is limited to not more than 4 bits, are only these two numerals optional? Apparently not, 6/7, 5/6 and 4/5 are also optional, and one of this three numerals may be closer to the numeral needing to be expressed. Based on this theory, during the simplification of a fraction in the foregoing approximation method 2, the strict mathematical method does not generate any error. The error is generated from the truncation. Therefore, this embodiment aims to improve the truncation. For example: suppose there is a determined fraction a/b, c/d closest to which needs to be found within a limited bit width. Firstly, the greatest common divisor of a and b is calculated, and then they are divided by the greatest common divisor. If the result is still not within the limited range, then a and b will undergo a truncation processing to obtain c and d within the limited range. The numerator and denominator of c/d are deviated by adding 1 to them or taking 1 from them to make the result is compared with a/b. After a few rounds of calculation, two fractions are obtained and the theoretical value of a/b is between the two fractions. The two fractions are two of c/d, (c+1)/(d+1), c/(d+1), (c+1)/d, (c−1)/d, c/(d−1) and (c−1)/(d−1). The closest parameter needs to be found and certainly is one of the two fractions. Of the two fractions, the one closer to the theoretical value of a/b is selected as configuration parameters NF and NR.

Figure 3:
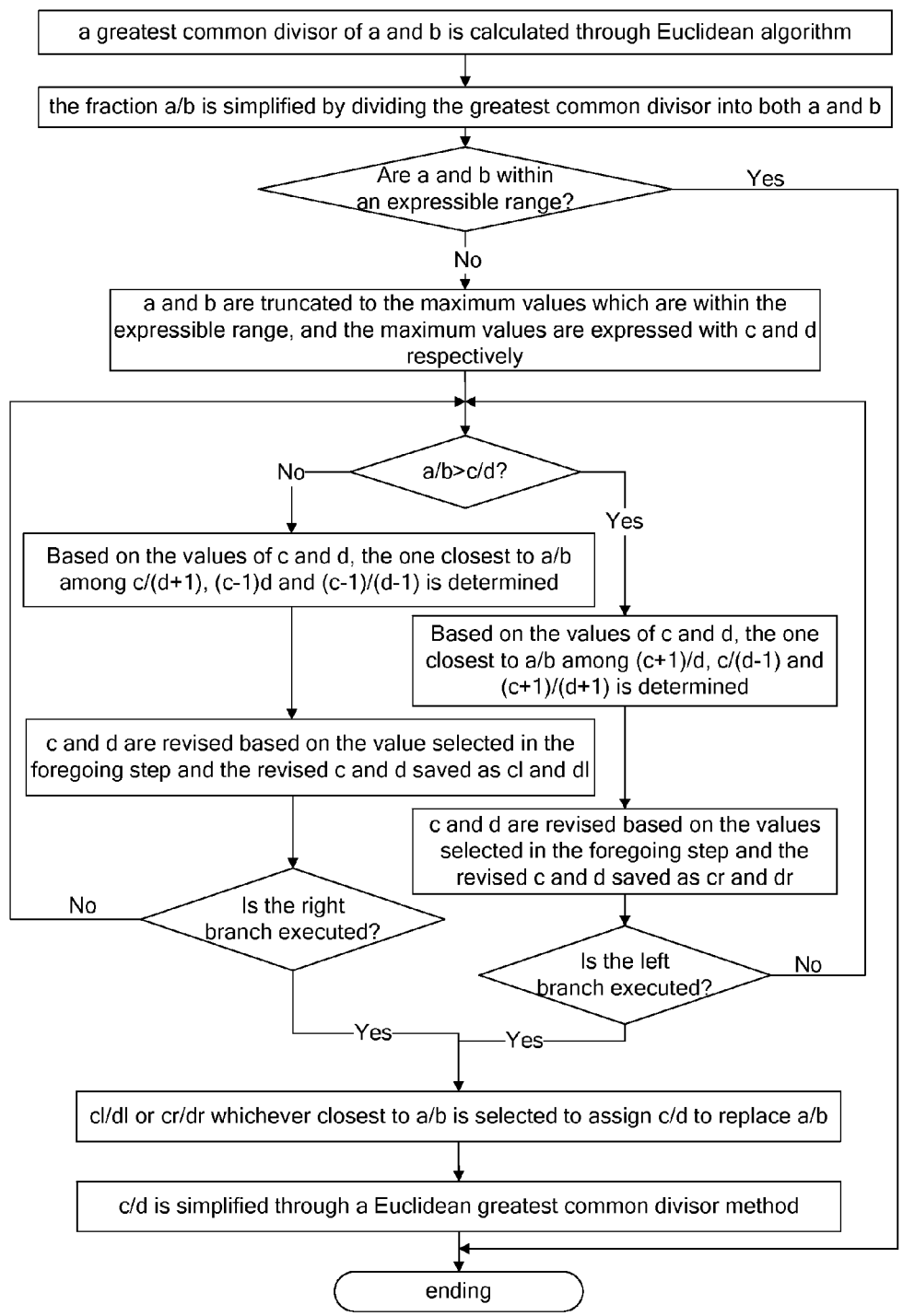
FIG. 3 is a schematic diagram illustrating an approximation algorithm used by an example of a method for managing handheld device power consumption provided by the embodiment of present invention in order to calculate the closest fraction.

Please refer to FIG. 3, which shows a flow chart of an approximation algorithm used by an example of the method for managing handheld device power consumption provided by the embodiment of present invention in order to calculate the closest fraction.

According to $$\frac{NF}{NR} = \frac{Fout \times No}{Fin},$$

a=NF=Fout×NO and b=NR=Fin are set. c/d that is closest to a/b needs to be found within the limited bit width.

Firstly, the greatest common divisor of a and b is calculated through Euclidean algorithm. The fraction a/b is simplified by dividing the greatest common divisor into both a and b to get a simplification result which is determined whether is within an expressible range. If yes, the algorithm will end; if still not within the limited range, a and b will undergo a truncation processing, where a and b are truncated to the maximum values which are within the expressible range. The maximum values are expressed with c and d respectively. In this way, the corresponding c and d within the limited range are obtained.

Secondly, a/b is compared with c/d. Here c/d is defined as a first fraction. If a/b is greater than c/d, the right branch in FIG. 3 will be executed, the numerator and denominator of c/d are deviated by adding 1 to them or taking 1 from them to obtain three fractions greater than the first fraction c/d, which are (c+1)/d, c/(d−1) and (c+1)/(d+1). Based on the values of c and d, the one closest to a/b among (c+1)/d, c/(d−1) and (c+1)/(d+1) is determined. From these three fractions, the fraction closest to a/b is selected and used to revise c/d. The revised c and d are saved and recorded as cr and dr. cr/dr may be defined as a second fraction. Then, determine whether the left branch in FIG. 3 has been executed, If not, comparing a/b with the revised c/d (i.e. cr/dr).

Similarly, if a/b is not greater than c/d, the left branch in FIG. 3 will be executed. The processing flow is similar to the foregoing processing flow of the right branch for the case that a/b is greater than c/d, i.e.: the numerator and denominator of c/d are deviated by adding 1 to them or taking 1 from them, to obtain three fractions smaller than the first fraction, where the three fractions are c/(d+1), (c−1)/d and (c−1)/(d−1). Further, based on the values of c and d, the one closest to a/b among c/(d+1), (c−1)/d and (c−1)/(d−1) is determined. From these three fractions, the fraction closest to a/b is selected and used to revise c/d. The revised c and d are saved and recorded as cl and dl. Then, determine whether the right branch in FIG. 3 has been executed or not. If not, a/b will be compared with the revised c/d (i.e. cl/dl). Here, cl/dl may be defined as a third fraction.

After both the left branch and right branch in FIG. 3 are executed, the one of cl/dl and cr/dr, which is closest to a/b, is selected and defined as a fourth fraction. c/d is assigned with the value of the fourth fraction to replace a/b. Then, c/d is simplified still by the method of calculating the greatest common divisor through Euclidean algorithm, where the greatest common divisor of the numerator and denominator of the fourth fraction is obtained. The numerator and denominator of the fourth fraction are both divided by the greatest common divisor to obtain NF/NR ratio. The result obtained after simplification is the result needed in step 2 of the foregoing solution 2. By now, the process of an approximation algorithm used by this embodiment in order to calculate the closest fraction ends.

Figure 4:
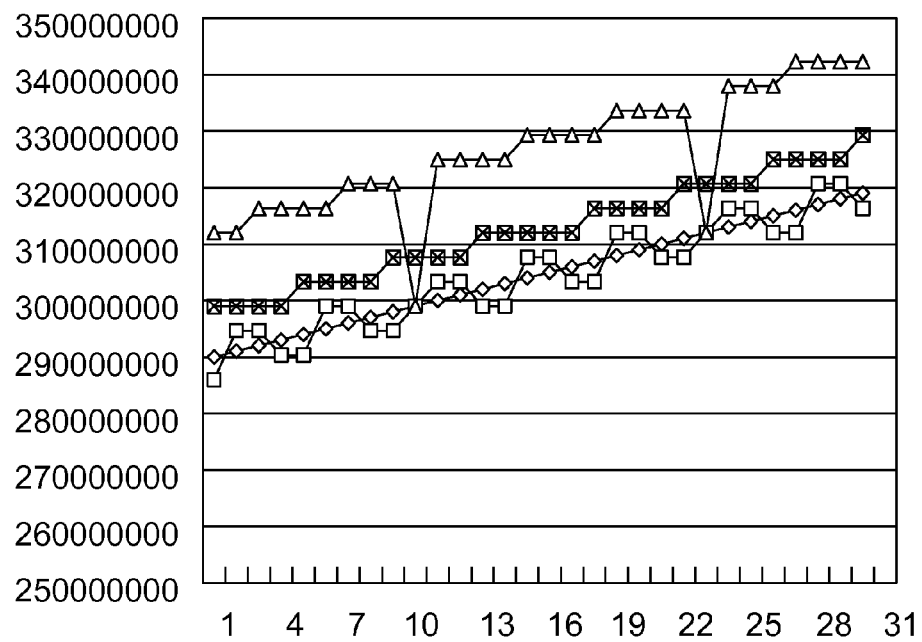
FIG. 4 is a comparison chart of the results of three approximation methods used by an embodiment of the present invention.

Please refer to FIG. 4, which is a comparison chart of the results of three approximation methods used by this embodiment, where ◆ stands for the frequency needing to be configured; ▢ stands for the frequency configured after improving the algorithm; ▲ stands for the frequency value obtained after dividing by the greatest common divisor and the truncation; ■ stands for the frequency value obtained by the direct truncation.

In FIG. 4, the first method corresponds to the frequency value obtained by the direct truncation, the second method corresponds to the frequency value obtained after dividing by the greatest common divisor and the truncation, and the third method corresponds to the frequency configured after improving the algorithm, where the vertical coordinate stands for frequency value. From FIG. 4, it may be known that these three methods all realize the effect of approaching to the theoretical value, and the third method is better than the first method and the second method.

Compared with the relating technologies, the method for managing handheld device power consumption provided by the embodiment of present invention sets the frequency of the currently operated function as the operating frequency, then sets the system clock of the handheld device according to this operating frequency the operating frequency is dynamically set to reasonably adjust the operating frequency when the handheld device executes more functions or fewer functions, so as to consume less power when the handheld device executes fewer functions.

Figure 5:
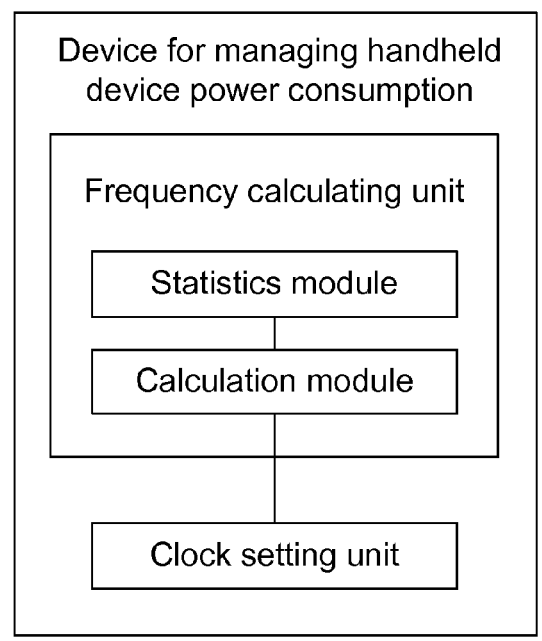
FIG. 5 is a structural schematic diagram illustrating an example of a device for managing the handheld device power consumption provided by the embodiment of present invention.

Accordingly, the embodiment of present invention also provides a device for managing handheld device power consumption. As shown in FIG. 5, the system comprises: a frequency calculating unit configured to calculate an operating frequency needed by a function currently operated by a handheld device; and a clock setting unit configured to set a system clock of the handheld device according to the operating frequency.

The frequency calculating unit further comprises: a statistics module configured to perform statistics on the number of cycles of the clocks used by the tasks or functions called by the currently operated function, formulate a relation table between tasks/functions and number of cycles, and revise the formulated relation table using the determined number of cycles of the tasks or functions; a calculation module configured to calculate the needed operating frequency according to the number of cycles of the clocks used by the tasks or functions called by the currently operated function.

In the foregoing system, the clock setting unit is further configured to set the output frequency of the system clock to be greater than or equal to the operating frequency.

The foregoing descriptions are preferred embodiments of the present invention and are not intended to limit the present invention. For those skilled in the art, the embodiment of present invention may have various changes and modifications. All modifications, equivalent replacements and improvements made without departing from the spirit and principle of the present invention shall be within the protection scope of the present invention.

What is claimed is:

1. A method for managing handheld device power consumption, comprising the following steps:
    calculating an operating frequency needed by a function currently operated by a handheld device; and
    setting a system clock of the handheld device according to the operating frequency,
    wherein the step of calculating the operating frequency needed by the function currently operated by the handheld device further comprises:
    performing statistics on a number of cycles of clocks used by tasks or functions called by the currently operated function;
    formulating a relation table between the tasks or functions and the number of cycles, and revising the formulated relation table by using the number of cycles of the tasks or functions; and
    calculating the needed operating frequency according to the number of cycles of the clocks used by the tasks or functions called by the currently operated function,
    wherein the step of setting the system clock of the handheld device according to the operating frequency further comprises:
    step 1: selecting a NO value according to $$\frac{NF}{NR} = \frac{Fout \times No}{Fin},$$

where NR is an input frequency division parameter, NF is a feedback parameter, NO is an output frequency division parameter, Fin is an input frequency, and Fout is an output frequency of the system clock;
    step 2: estimating the value of NF/NR; and
    step 3: determining whether the output frequency obtained through a calculation is equal to the operating frequency; if the output frequency is equal to the operating frequency, configuring the handheld device with the NO, NF and NR values to which the output frequency corresponds; if the output frequency is not equal to the operating frequency, executing step 1 till there is not an unselected NO value, finding an output frequency closest to the operating frequency and configuring the handheld device with the NO, NF and NR values to which the closest output frequency corresponds when there is not an unselected NO value.

2. The method for managing handheld device power consumption according to claim 1, wherein the step of calculating the needed operating frequency further comprises:
    dividing a time period of the currently operated function into the total number of cycles of the clocks used by the tasks or functions called by the currently operated function, to obtain the operating frequency of the currently operated function.

3. The method for managing handheld device power consumption according to claim 2, wherein the number of cycles is a number of static cycles obtained through statistics in a simulation environment or a number of dynamic cycles obtained through operating the tasks or functions time and again.

4. The method for managing handheld device power consumption according to claim 1, wherein
    the number of cycles is a number of static cycles obtained through statistics in a simulation environment or a number of dynamic cycles obtained through operating the tasks or functions time and again.

5. The method for managing handheld device power consumption according to claim 1, wherein the step of setting the system clock of the handheld device comprises:
    setting an output frequency of the system clock to be greater than or equal to the operating frequency.

6. The method for managing handheld device power consumption according to claim 1, wherein step 2 further comprises:
    cutting a same number of bits from the bits of Fout×NO and Fin, and then rounding the Fout×NO and Fin which have been cut to ensure the number of bits of the processed Fout×NO and that of the processed Fin accord with the number of the bits for expressing the frequency of the handheld device.

7. The method for managing handheld device power consumption according to claim 1, wherein step 2 further comprises:
    calculating a greatest common divisor of Fout×NO and Fin, and dividing the greatest common divisor into Fout×NO and Fin;
    if the numbers of the bits of the two quotients obtained by dividing the greatest common divisor into Fout×NO and Fin do not accord with the number of the bits for expressing the frequency of the handheld device, then cutting a same number of bits from the bits of the two quotients and rounding the quotients which have been cut to make them accord with the number of the bits for expressing the frequency of the handheld device;
    wherein the ratio of the two quotients is defined as a first fraction.

8. The method for managing handheld device power consumption according to claim 7, wherein after the step of cutting a same number of bits from the bits of the two quotients and rounding the quotients which have been cut to make them accord with the number of the bits for expressing the frequency of the handheld device, the method further comprises:
    step a: determining whether the first fraction is smaller than the ratio of Fout×NO to Fin, executing step b if the first fraction is smaller or executing step c if the first fraction is not smaller;
    step b: adding 1 to the numerator of the first fraction and taking 1 from the denominator, or adding 1 to both the numerator and denominator to obtain three fractions which are greater than the first fraction; choosing the fraction closest to the ratio of Fout×NO to Fin from those three fractions, and defining this chosen fraction as a second fraction, replacing the first fraction with the second fraction; determining whether step c has been executed, and executing step d if step c has been executed or executing step a if step c has not been executed;

step c: taking 1 from the numerator of the first fraction, or adding 1 to the denominator, or taking 1 from both the numerator and denominator to obtain three fractions which are smaller than the first fraction; choosing the fraction closest to the ratio of Fout×NO to Fin from those three fractions, and defining this chosen fraction as a third fraction, replacing the first fraction with the third fraction; determining whether step b has been executed, and executing step d if step b has been executed or executing step a if step b has not been executed; and step d: choosing the fraction closest to the ratio of Fout× NO to Fin from the second fraction and the third fraction, defining this chosen fraction as a fourth fraction, calculating the greatest common divisor of the numerator and denominator of the fourth fraction, and dividing the greatest common divisor into the numerator and denominator of the fourth fraction to obtain NF/NR ratio.

9. A device for managing handheld device power consumption, comprising a frequency calculating unit and a clock setting unit; wherein
the frequency calculating unit is configured to calculate an operating frequency needed by a function currently operated by a handheld device; and
the clock setting unit is configured to set a system clock of the handheld device according to the operating frequency,
the clock setting unit is further configured to perform the following steps:
step 1: selecting a NO value according to $$\frac{NF}{NR} = \frac{Fout \times No}{Fin},$$

where NR is an input frequency division parameter, NF is a feedback parameter, NO is an output frequency division parameter, Fin is an input frequency, and Fout is an output frequency of the system clock;
step 2: estimating the value of NF/NR; and
step 3: determining whether the output frequency obtained through a calculation is equal to the operating frequency; if the output frequency is equal to the operating frequency, configuring the handheld device with the NO, NF and NR values to which the output frequency corresponds; if the output frequency is not equal to the operating frequency, executing step 1 till there is not an unselected NO value, finding an output frequency closest to the operating frequency and configuring the handheld device with the NO, NF and NR values to which the closest output frequency corresponds when there is not an unselected NO value.

10. The device for managing handheld device power consumption according to claim 9, wherein the clock setting unit is further configured to set an output frequency of the system clock to be greater than or equal to the operating frequency.

11. A method for managing handheld device power consumption, comprising the following steps:
calculating an operating frequency needed by a function currently operated by a handheld device; and setting a system clock of the handheld device according to the operating frequency,
wherein the step of setting the system clock of the handheld device according to the operating frequency further comprises:
step 1: selecting a NO value according to $$\frac{NF}{NR} = \frac{Fout \times No}{Fin},$$

where NR is an input frequency division parameter, NF is a feedback parameter, NO is an output frequency division parameter, Fin is an input frequency, and Fout is an output frequency of the system clock;
step 2: estimating the value of NF/NR; and
step 3: determining whether the output frequency obtained through a calculation is equal to the operating frequency; if the output frequency is equal to the operating frequency, configuring the handheld device with the NO, NF and NR values to which the output frequency corresponds; if the output frequency is not equal to the operating frequency, executing step 1 till there is not an unselected NO value, finding an output frequency closest to the operating frequency and configuring the handheld device with the NO, NF and NR values to which the closest output frequency corresponds when there is not an unselected NO value.

12. The method for managing handheld device power consumption according to claim 11, wherein step 2 further comprises:
cutting a same number of bits from the bits of Fout×NO and Fin, and then rounding the Fout×NO and Fin which have been cut to ensure the number of bits of the processed Fout×NO and that of the processed Fin accord with the number of the bits for expressing the frequency of the handheld device.

13. The method for managing handheld device power consumption according to claim 11, wherein step 2 further comprises:
calculating a greatest common divisor of Fout×NO and Fin, and dividing the greatest common divisor into Fout×NO and Fin;
if the numbers of the bits of the two quotients obtained by dividing the greatest common divisor into Fout×NO and Fin do not accord with the number of the bits for expressing the frequency of the handheld device, then cutting a same number of bits from the bits of the two quotients and rounding the quotients which have been cut to make them accord with the number of the bits for expressing the frequency of the handheld device;
wherein the ratio of the two quotients is defined as a first fraction.

14. The method for managing handheld device power consumption according to claim 13, wherein after the step of cutting a same number of bits from the bits of the two quotients and rounding the quotients which have been cut to make them accord with the number of the bits for expressing the frequency of the handheld device, the method further comprises:
step a: determining whether the first fraction is smaller than the ratio of Fout×NO to Fin, executing step b if the first fraction is smaller or executing step c if the first fraction is not smaller;
step b: adding 1 to the numerator of the first fraction and taking 1 from the denominator, or adding 1 to both the numerator and denominator to obtain three fractions which are greater than the first fraction; choosing the fraction closest to the ratio of Fout×NO to Fin from those three fractions, and defining this chosen fraction as a second fraction, replacing the first fraction with the second fraction; determining whether step c has been executed, and executing step d if step c has been executed or executing step a if step c has not been executed;

step c: taking 1 from the numerator of the first fraction, or adding 1 to the denominator, or taking 1 from both the numerator and denominator to obtain three fractions which are smaller than the first fraction; choosing the fraction closest to the ratio of Fout×NO to Fin from those three fractions, and defining this chosen fraction as a third fraction, replacing the first fraction with the third fraction; determining whether step b has been executed, and executing step d if step b has been executed or executing step a if step b has not been executed; and step d: choosing the fraction closest to the ratio of Fout× NO to Fin from the second fraction and the third fraction, defining this chosen fraction as a fourth fraction, calculating the greatest common divisor of the numerator and denominator of the fourth fraction, and dividing the greatest common divisor into the numerator and denominator of the fourth fraction to obtain NF/NR ratio.

15. The method for managing handheld device power consumption according to claim 11, wherein the step of setting the system clock of the handheld device comprises:

setting an output frequency of the system clock to be greater than or equal to the operating frequency.

* * * * *